Jan. 28, 1958     L. HEINOO     2,821,399
CARD PLAYING MACHINE
Filed June 24, 1955     9 Sheets-Sheet 1
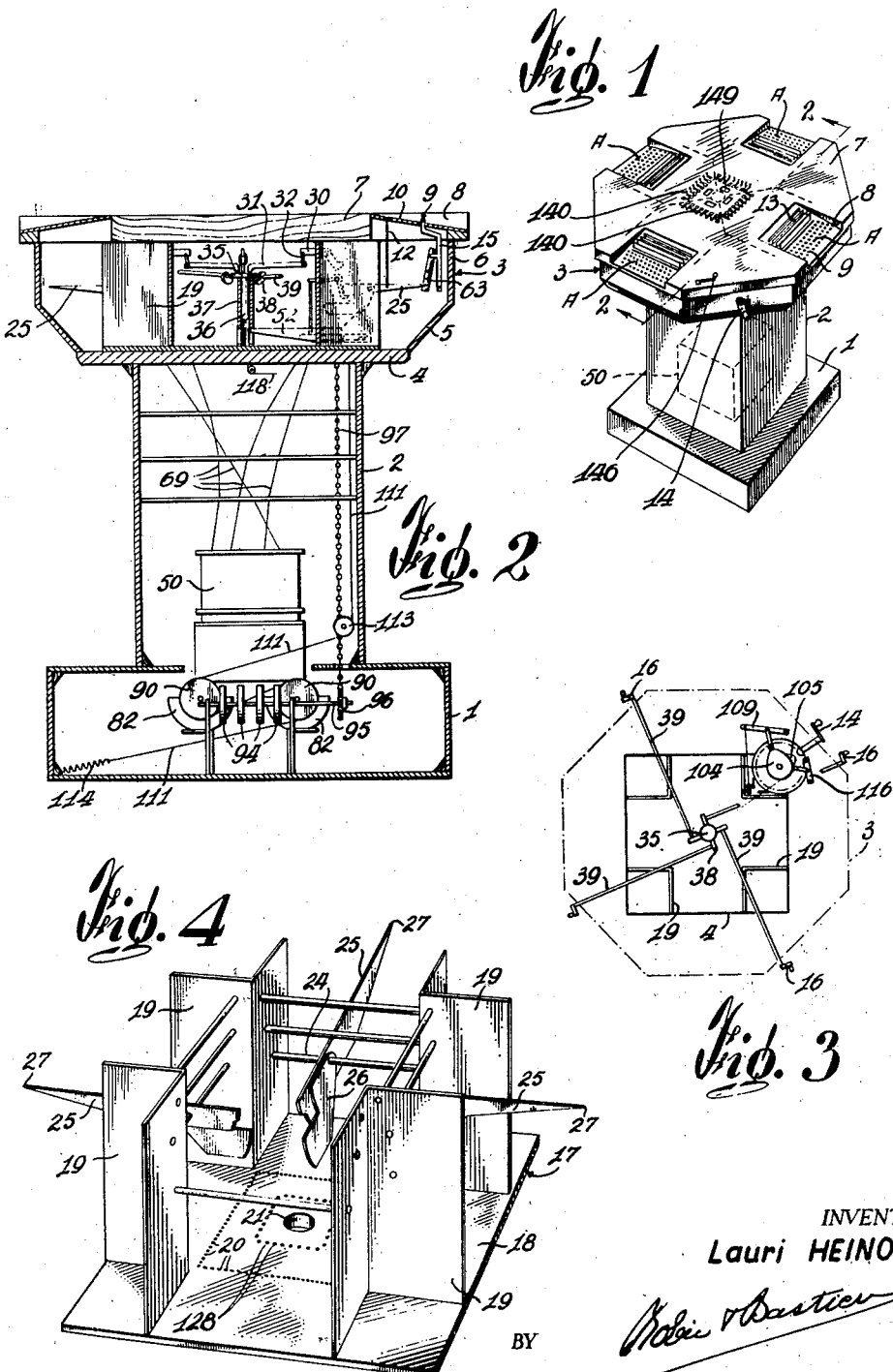
INVENTOR
Lauri HEINOO
BY
ATTORNEYS

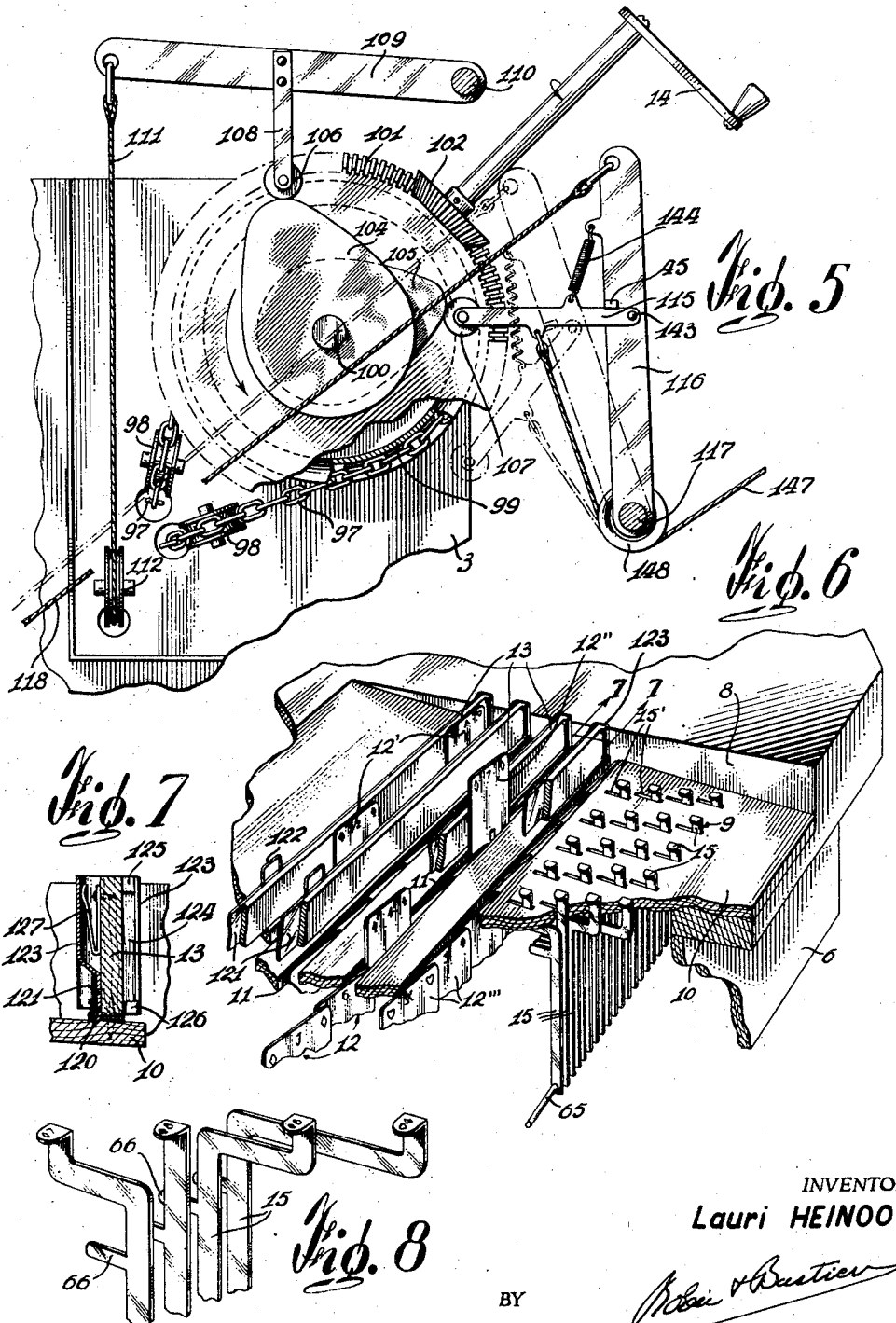

INVENTOR
Lauri HEINOO

BY

ATTORNEYS

Jan. 28, 1958  L. HEINOO  2,821,399
CARD PLAYING MACHINE
Filed June 24, 1955  9 Sheets-Sheet 4

INVENTOR
Lauri HEINOO
BY
ATTORNEYS

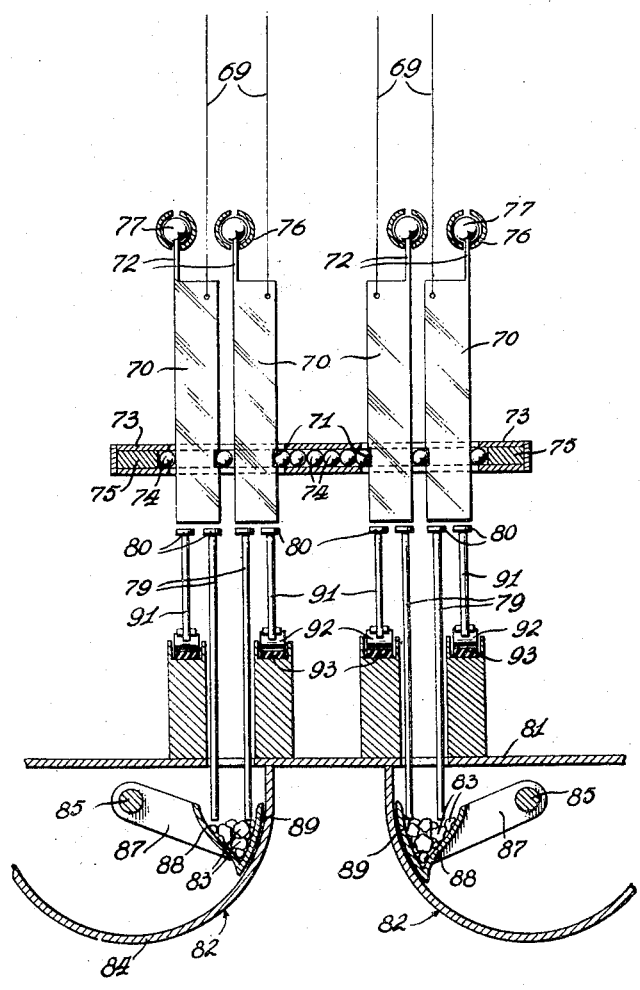
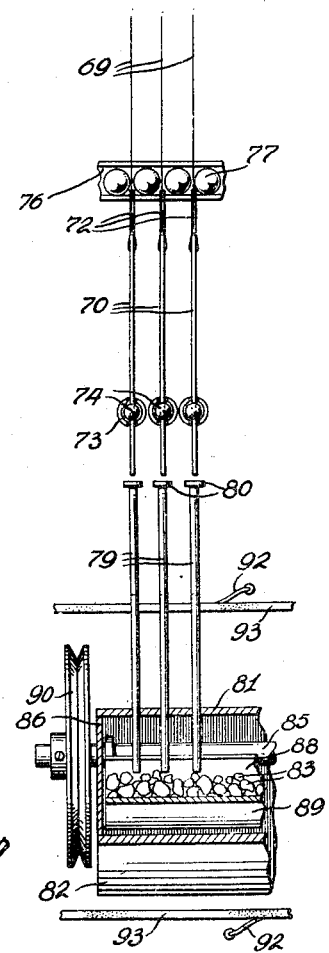

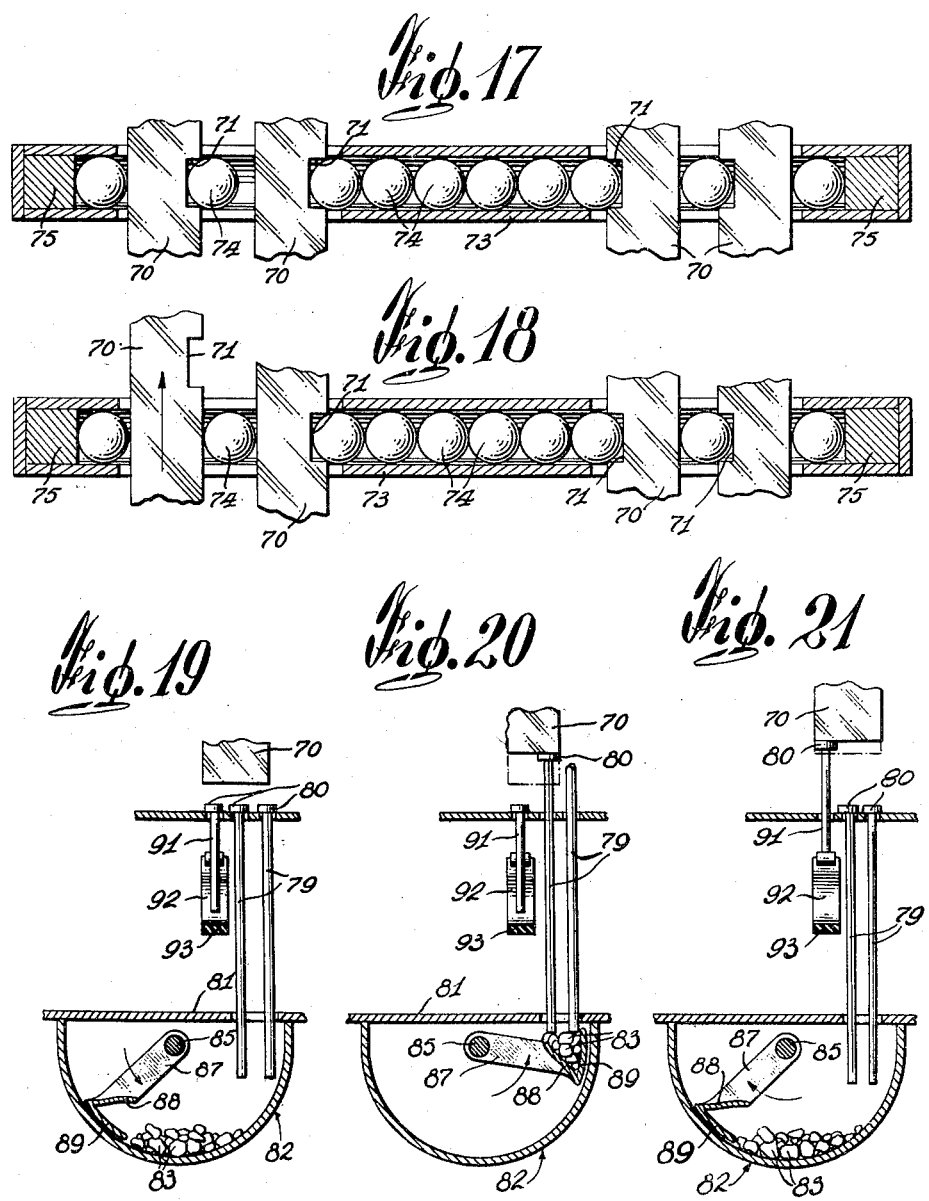

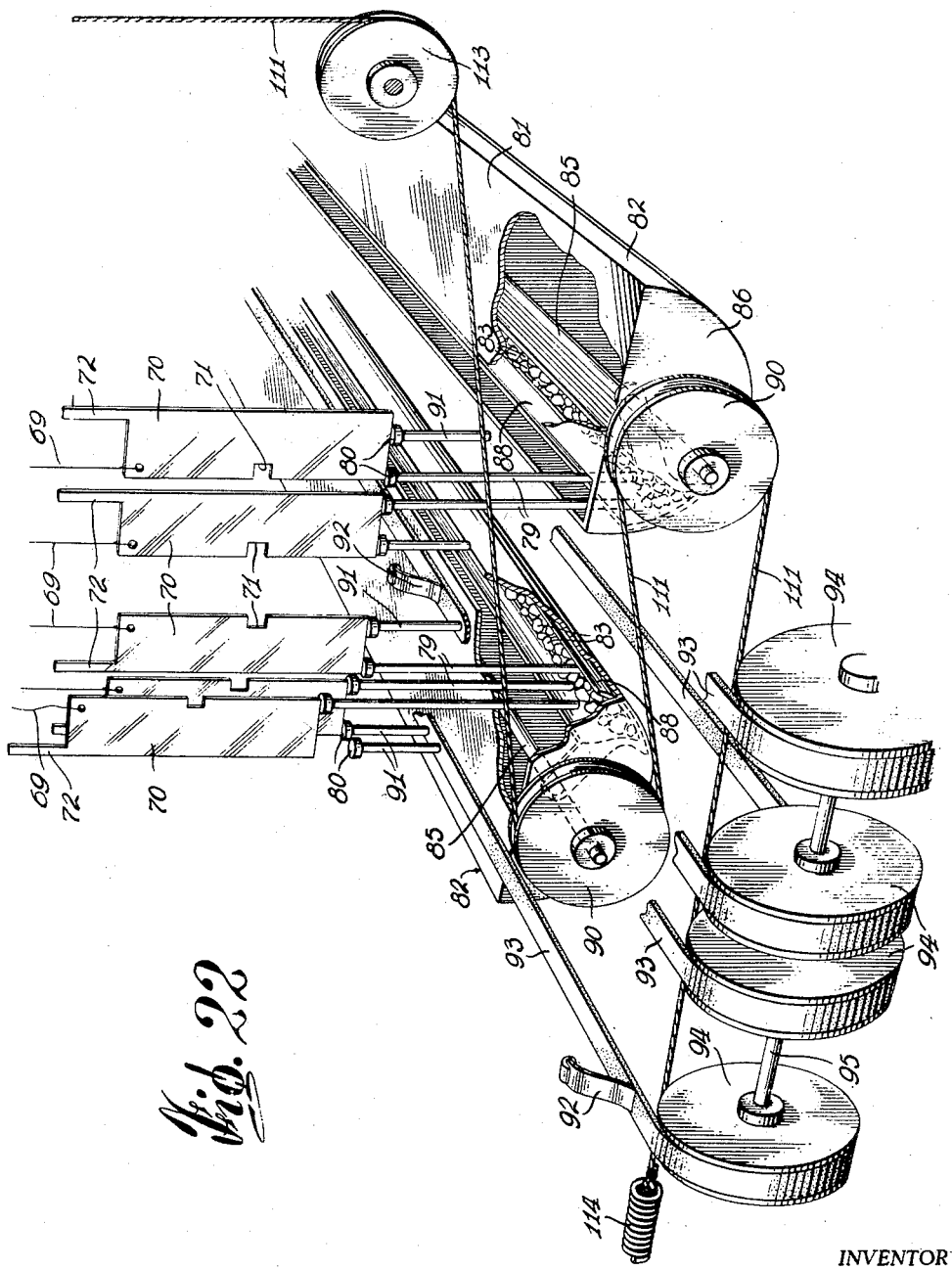

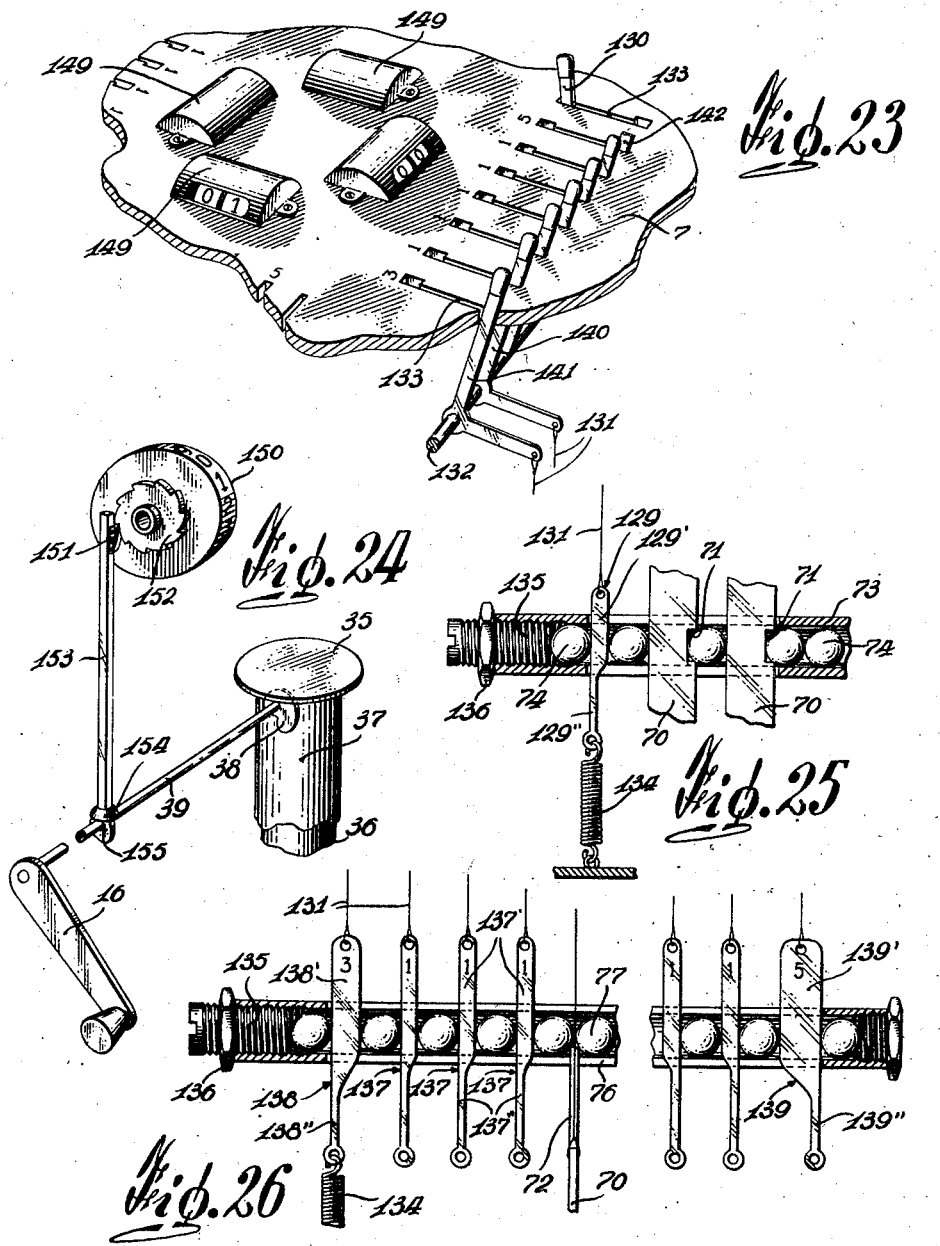

United States Patent Office 2,821,399
Patented Jan. 28, 1958

2,821,399

CARD PLAYING MACHINE

Lauri Heinoo, Arvida, Quebec, Canada

Application June 24, 1955, Serial No. 517,867

34 Claims. (Cl. 273—149)

The present invention relates to a card playing machine which may be adapted for playing various card games.

The general object of the present invention is the provision of a card playing machine in which the players do not touch the cards at any time during the game, there being provided a keyboard for each player whereby operation of said keyboard will selectively show the card being played to the other players.

Another important object of the present invention is the provision of a novel device for shuffling and dealing the cards completely at random and in such a manner that cheating is absolutely impossible.

Another important object of the present invention is the provision of a card playing machine in which operation of a crank handle will distribute the cards to the players in an absolutely haphazard manner and the correct number of cards for the game being played.

Yet another important object of the present invention is the provision in a card playing machine of the character described of means to positively limit the number of cards distributed to each player and also to positively prevent the same card from being dealt to more than one player.

Still another important object of the present invention is the provision of a card playing machine of the character described provided with means to positively return all the cards to a "non dealt" or retracted position after a hand is played and with means to return the "played" cards to retracted position at the end of one round.

The foregoing and other important objects of the present invention will become more apparent during the following disclosure and by referring to the drawings in which:

Figure 1 is a perspective view of the card playing machine according to the invention;

Figure 2 is a longitudinal section of the same;

Figure 3 is a diagrammatic plan view of the machine;

Figure 4 is a perspective view of the assembly of main levers disposed underneath the table top of the machine;

Figure 5 is an elevation of the cam means for shuffling the cards and operating other elements of the machine;

Figure 6 is a partial perspective view of one of the keyboards;

Figure 7 is a cross-section taken along line 7—7 of Figure 6;

Figure 8 is a partial perspective view of some of the keys of a keyboard;

Figure 14 is a cross-sectional elevation of the means for shuffling the cards and dealing the same to the players;

Figure 15 is a partial longitudinal section of the means shown in Figure 14;

Figures 17 and 18 are longitudinal sections of the means for preventing the same card from being dealt to more than one player;

Figures 19, 20 and 21 are cross-sections of the shuffling means shown in different positions;

Figure 22 is a partial perspective view of said shuffling means;

Figure 23 is a partial perspective view of the table top showing the counters adapted to count the number of tricks for each player when playing bridge and the like game, and also showing the levers operable for varying the maximum number of cards to be dealt in a single dealing operation;

Figure 24 is a partial perspective view of the means for operating the counters shown in Figure 23;

Figure 25 is a partial longitudinal section of the means for preventing the joker from being dealt to more than one player and also showing the means for preventing the joker from being dealt to any one player;

Figure 26 is a longitudinal section of the ends of the tube shown in Figure 16, showing the means for varying the maximum number of cards to be dealt in one single shuffling and dealing operation, and operable by the lever means shown in Figure 23.

Figure 9:
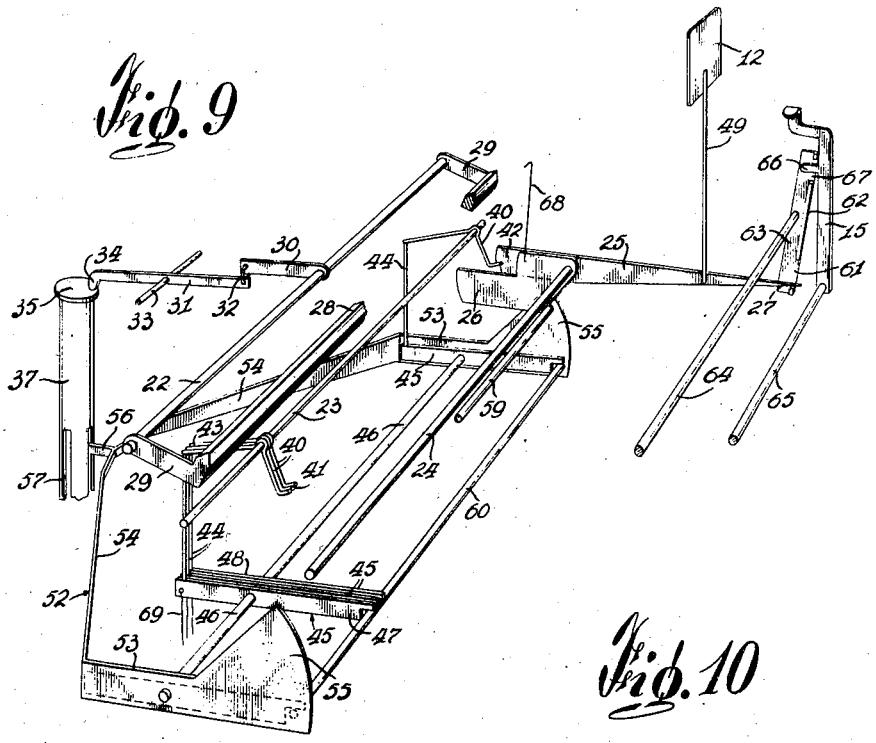
Figure 9 is a partial perspective view of the mechanism associated with the keyboard for operating the card elements.

Referring more particularly to the drawings in which like reference characters indicate like elements throughout, the card playing machine, according to the present invention, is housed within a table-like structure comprising a base 1, a column 2 upstanding from the base 1 and supporting a table top, generally indicated at 3, and which has substantially an octagonal shape. The table top 3 consists in a bottom partition 4 affixed directly to the upper edge of the column 2, side walls 5—6, and a top panel 7 which is provided with four recesses 8 disposed in aligned pairs, each pair being at right angles to the other pair so as to provide four playing stations A.

A keyboard, generally indicated at 9, is disposed in each of the recesses 8. As shown in Figure 6, the panel 10 of each keyboard is provided with slits 15′ through which project keys 15 which are arranged in four rows. Four transverse slits 11 are made in the panel 10 and are disposed inwardly of the keys 15, that is, towards the center of the table, and card elements 12 are adapted to pop up through said slits 11. A shield 13 extends parallel to each slit 11 and inwardly thereof, said shield 13 having such a height as to hide the elements 12 from the view of the other players at the other playing stations when said card elements 12 are in a raised intermediate position, as shown in 12′ in Figure 6. When a card element 12 is in its limit upper position, as shown at 12″ in Figure 6, it extends beyond the upper edge of the shield 13 so as to be seen by the other players at the other playing stations. When the card elements 12 are in retracted position 12′″, they are disposed underneath the panel 10 of the keyboard so as to be hidden from view of all the players. Each playing station is provided with a complete deck of card elements 12, for instance, fifty-three including the joker. A key 15 is associated with each card element 12.

The shields 13 are pivotable on hinges 120 to take a position flat against the panel 10 when it is desired that the card elements which are in the intermediate position 12′ be visible to all the players as, for instance, when a player is the dummy when playing bridge.

Furthermore, the shields 13 are each provided with an additional shield 121 which is normally in retracted position against the inner face of the shield 13 but which may be extended upwardly by means of the handle 122 in order to hide the cards, which are in the upper limit position 12″, from view of the other players. The additional shield 121 is used when playing certain types of poker as will be described later on. The shield 121 extends the whole length of the shield 13 and is provided with a T-shaped portion 123 at both ends adapted to surround the ends of the shield 13 and a small rib 124 secured to the outside face of the shield 13 and flush with the ends thereof. The rib 124 is provided with an abutment 125 at its upper end adapted to abut the finger 126 depending from the lower end of the T-shaped portion 123 in order to positively limit the upward displacement of the additional shield 121 with respect to the shield 13. A leaf spring 127, which engages the inner face of the T-shaped portion 123 of the shield 121, is adapted to hold the said shield 121 in extended position.

To "deal" the cards to the players to play a "hand," a crank handle 14 is operated, said crank handle 14 actuating a shuffling and dealing mechanism, to be described later on, which allows a predetermined number of card elements 12 to pop up from the retracted position 12‴ to the intermediate position 12′ at each keyboard area or playing station A. To play a round, each player actuates the desired key 15 so as to cause the card element associated therewith and in the intermediate position 12′ to be raised into the position 12″. After a round has been played in this manner, any one of the four crank handles 16 is operated to retract the card elements from the position 12″ to the retracted position 12‴. When the hand is completed, all the card elements are in the retracted position 12‴. The crank handle 14 is again operated to play another hand.

Referring to Figures 2 and 4, a sheet metal frame member 17 is supported on the partition 4 and consists in a square plate 18 on which are mounted four uprights 19 of L-shaped cross-section and disposed at the four corners of the plate 18, the plate 18 is provided with a series of holes 20 arranged in a square, the four corners of which are adjacent the corners of the L-shaped uprights 19. Furthermore, the plate 18 is provided with a central circular opening 21 and a second series of holes 128 also arranged in a square. Transverse rods are secured to each of the facing parallel wings of the uprights 19 and serve as pivots for part of the mechanism for each of the playing stations. A plurality of levers 25 are pivotally mounted intermediate their ends on each of the rods 24, said levers 25 being provided with a counter weight 26 at their inner end so as to normally cause pivotal movement of the levers 25 to elevate their outer pointed ends 27. There are as many levers 25 as there are card elements 12, and they are disposed side by side in close parallel relationship on their pivot rods 24. There are as many holes 20 in the plate 18 as there are levers 25, each hole 20 being disposed directly underneath the corresponding lever 25.

Figure 13:
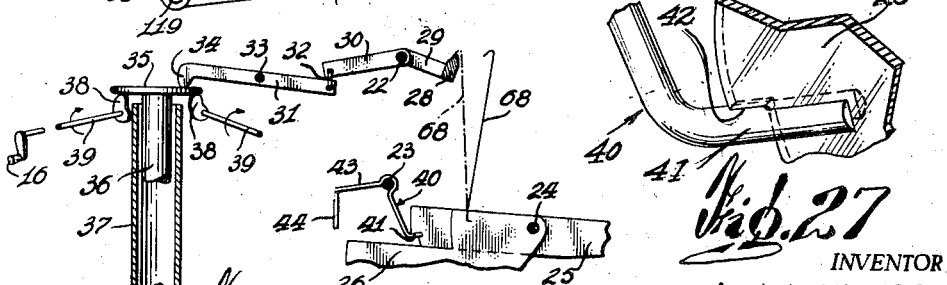

Referring to Figures 9 and 13, a V-shaped bar 28 is secured at both ends by means of arms 29 to a rod 22 journalled in uprights 19. The bar 28 and arms 29 form a stirrup. A center arm 30 is rigidly secured to the middle portion of the rod 22 and is linked to a rocking lever 31 by means of a ring 32. The rocking lever 31 is pivoted intermediate its ends on a stationary pivot rod 33 and is provided at its inner end with a downwardly extending tip 34 abutting against a cap 35 which forms the upper end of a finger 36 which slidably extends within a central upright tube 37. The tube extends through central opening 21 of plate 18 and is secured to the latter. The finger 36 and cap 35 are lifted relative to the central tube 37 by means of any one of the four cam members 38 which are each operated by a shaft 39 and the crank handle 16. Thus the operation of any one of the four crank handles 16, one at each playing station, will cause lifting of the cap 35 and pivotal movement of the rocking lever 31 and the resulting elevation of the V-shaped bar or stirrup 28.

Figure 10:
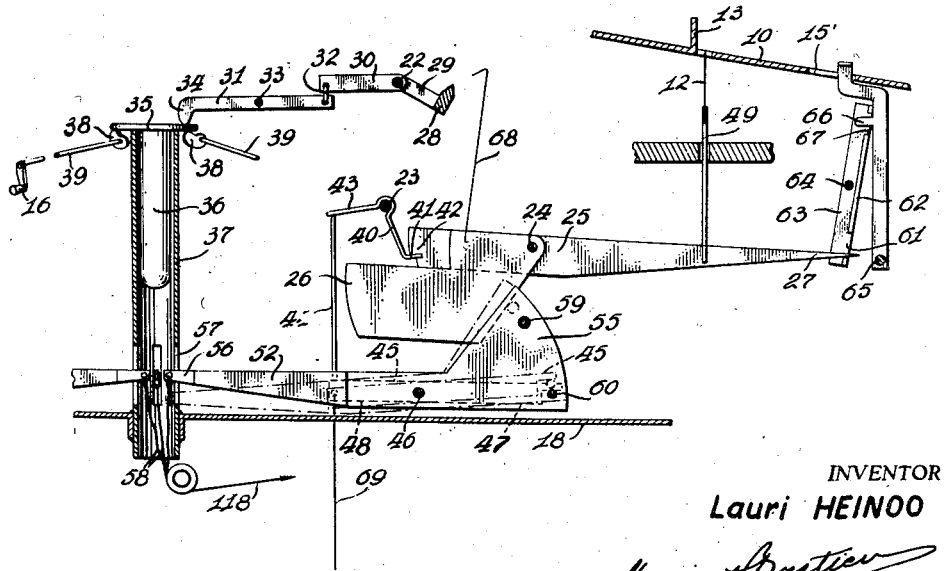
Figures 10 to 13 are side elevations of the same mechanism showing various operative positions of the same.
Figure 11:
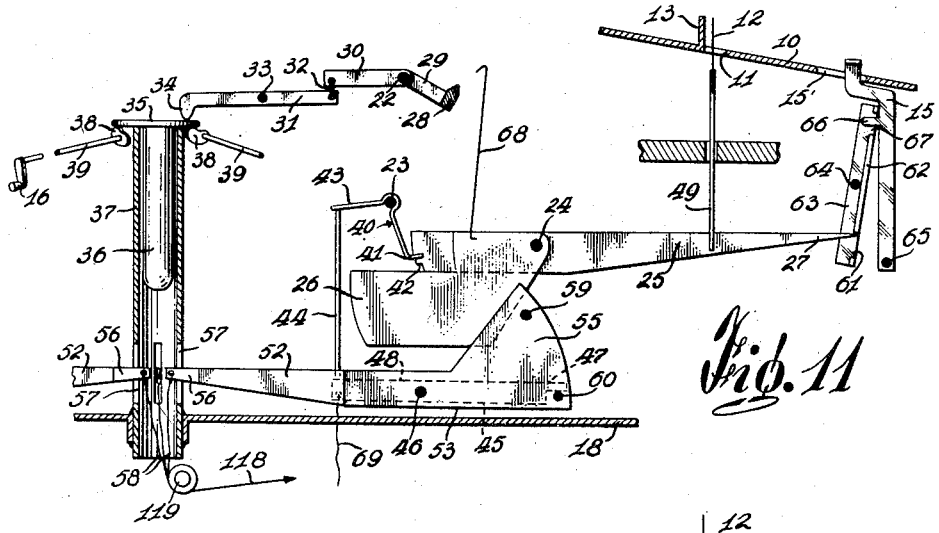
Figure 27:
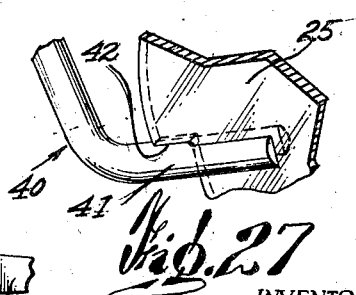
Figure 27 is a partial perspective view, on an enlarged scale, of two elements shown in Figures 9 to 13.

A set of angular latching wire members 40 are pivotally mounted on a rod 23 which is secured to the uprights 19 of the frame 17 (Figure 9). Each of the latching members 40 has a longitudinally slit end 41 to engage the stepped inner edge portion 42 of the associated lever 25 (Figure 27). The latching members 40 are so dimensioned as to normally freely rotate in a counter clockwise direction, as seen in Figure 10, so that their slit end 41 will be urged to engage the stepped edge 42 of the levers 25. When the inner end 43 of the latching member 40 is lifted so that its slit end 41 releases the step of the edge 42 of the lever 25, the latter will pivot in a counter clockwise direction under the action of the counter weight 26. This is accomplished by means of an upright rod 44 attached at its lower end to the inner end of a pivoted bar 45, said rod 44 having its upper end engaging the end 43 of the latching member 40. The bars 45 are pivoted intermediate their ends on a transverse rod 46 which is secured to the uprights 19. The outer arm 47 of the bars 45 is substantially longer than the inner arm 48 so that said bars 45 will tend to rotate freely in a clockwise direction (looking at Figure 10) to lift the upright rods 44 which will in turn rotate the latching wire 40 in a clockwise direction so that the slit end 41 of the same will disengage the step of the edge 42 of the lever 25 to allow counter clockwise pivotal movement of the latter so that its outer pointed end 27 will be raised. In this manner the elements 12, which are mounted on the levers 25 will be raised to their intermediate position 12′, seen in Figure 11. Each card element 12 is secured at the upper end of an upright rod 49 which is slit at its lower end to straddle the lever 25 at a point intermediate the outer pointed end 27 and the pivotal rod 24 of said lever 25.

A yoke member 52 consisting of sides 53 and connecting strip 54, is pivotally mounted on the rod 46. The outer end portions of the sides 53 are sector-shaped, as shown at 55, to provide a counter weight whereby the yoke member 52 will be urged to rotate in a clockwise direction, as seen in Figure 10, about its pivotal rod 46. The center portion of the strip 54 is provided with a projection 56 adapted to engage a slot 57 made in the central tube 37. There in one yoke member 52 for each playing station and each one is located between the parallel wings of the uprights 19. The inner ends of the four projections 56 are attached to strings 58 (see Figure 10) which are actuated by a suitable device (described later on) for simultaneously pivoting the yoke members 52 of the four playing stations in a counter clockwise direction (looking at Figure 10) so that a transverse rod 59 which is secured between the two sector-shaped portions 55 of each yoke member 52 will abut against the counter weight 26 of the levers 25 so as to rotate the latter in clockwise direction (looking at Figure 10). All said levers 25 are thus returned to their retracted latched position in which the card elements 12 are all retracted to position 12‴. Upon counter clockwise pivotal movement of the yoke member 52 under the action of strings 58, the bars 45 are also positively pivoted in a counter clockwise direction because their notched outer arms 47 engage a rod 60 which is also secured to the sectors 55 of the yoke member 52. Thus the bars 45 are rotated so as to release the latching members 40 to permit the latter to engage the levers 25 and latch the same in inoperative position.

The outer end 27 of each lever 25 is engaged in a recess 61 of the side flange 62 of a rocking bar 63 which is pivoted on a stationary transverse rod 64. All the keys 15 of the keyboard 9 are pivotally mounted at their lower end on a stationary transverse rod 65. Each key 15 is provided with a finger 66 adapted to engage an upper recess 67 made in the side flange 62 of a rocking bar 63.

Figure 12:
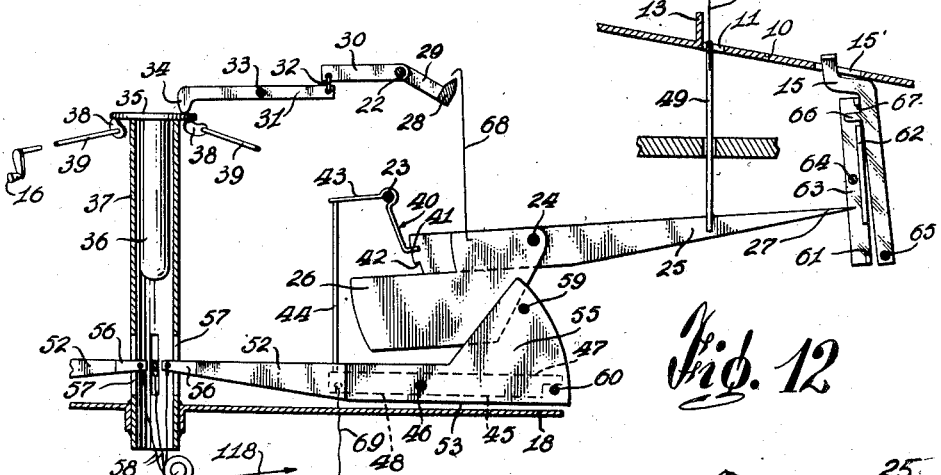

Inward pivotal movement of a key 15 about its pivot rod 65 will cause counter clockwise pivotal movement of the bar 63 so as to release the tip 27 of the lever 25 as shown in Figure 12, and the card element 12 is elevated to its fully raised position 12". In the corresponding position of the lever 25, the stirrup 28 is engaged by a wire hook 68 which depends from said lever 25. Thus the card element 12 is retained in its fully raised position 12" once it has been released by its associated lever key 15, and can only be returned to its retracted position 12''' by pressing down directly on said card element 12 or by the actuation of the stirrup 28 through the means of the crank handle 16.

Each bar 45 is attached at its inner end 48 to a string 69 which is normally maintained taut so as to maintain the associated card element in retracted position 12'''. Each string 69 passes through one of the openings 20 made in the plate 18 of the frame 17, as shown in Figure 4, and enters a box 50 (see Figure 2) in which is located the shuffling and dealing device according to the present invention. This device, which operates to loosen the strings 69 so that the card elements associated therewith can be dealt, is shown in more detail in Figures 14 to 22, and 25 and 26. Rreferring to Figure 22, it is seen that each string 69 is attached at its lower end to a slide 70 in the form of a thin sheet metal element of rectangular shape having a notch 71 in the middle of one of its longitudinal edges and provided at its upper end with an upstanding thin finger 72.

There are four longitudinal rows of slides 70, each row associated with a playing station. There are as many such slides 70 in each row as there are card elements 12 at each playing station. Furthermore, the slides 70 of the longitudinal rows are substantially transversely aligned to form cross rows each containing four slides 70 which are associated with identical card elements, one slide for each playing station. As shown in Figure 14, the four aligned slides 70 of a cross row are vertically slidable through slits made in a transversely extending tube 73 in which there are disposed a plurality of metal balls 74 engageable with the side notches 71 of the slides 70. The transverse tube 73 is plugged at both ends as shown at 75. The balls 74 are free to move within the tube 73 but the total free space within the tube 73 is equal to the depth of side notch 71 of one slide 70. Thus when either one of the four slides 70 of a cross row is raised with respect to the tube 73 so that the ball 74, formerly engaging the side notch 71 of said raised slide 70, will now engage the side edge thereof, all the remaining balls 74 will be displaced within the tube 73 to such an amount that there will be no more space left between the balls and the ends of the tube 73, as shown in Figure 18, thereby blocking the remaining slides 70 in their lower position in which their side notches 71 are positively engaged by the balls 74. Thus this arrangement positively prevents the same card element from being dealt to more than one player.

The arrangement just described is slightly modified, as shown in Figure 25, for the cross row of slides 70 associated with the card elements bearing the joker configuration. The tube for the joker card elements is slightly longer than the tubes 73 of the remaining card elements and is provided with an extra ball 74 and with a wedge member 129 which is vertically slidable through the slits of tube 73' and between two balls 74. The wedge 129 has a wide part 129' which, when engaging the balls 74 causes the latter to engage the side notches 71 of all the slides 70 of the cross row to thereby prevent the joker from being dealt, such as when playing bridge. When the narrow part 129' of the wedge 129 engages the balls 74, one joker card element may be dealt to any one of the players.

The wedge 129 is moved between its two positions, namely a joker dealing position and a joker non-dealing position, by means of a bell crank lever 130 (Figure 23) which is pivotally mounted on a shaft 132, passes through a slot 133 made in the table top panel 7 and is connected to the wedge 129 by a string 131. A spring 134 urges the wedge 129 in joker non-dealing position. A set screw 135 threadedly engages one or both ends of tube 73' to adjust the spacing between the balls 74; the set screw is locked by a locking nut 136. Set screws 135 and locking nuts 136 may be substituted for the plugs 75 in the tubes 73.

According to the present invention means are provided to prevent more than a predetermined number of cards from being dealt to any one player in one deal, for instance more than thirteen card elements.

Figure 16:
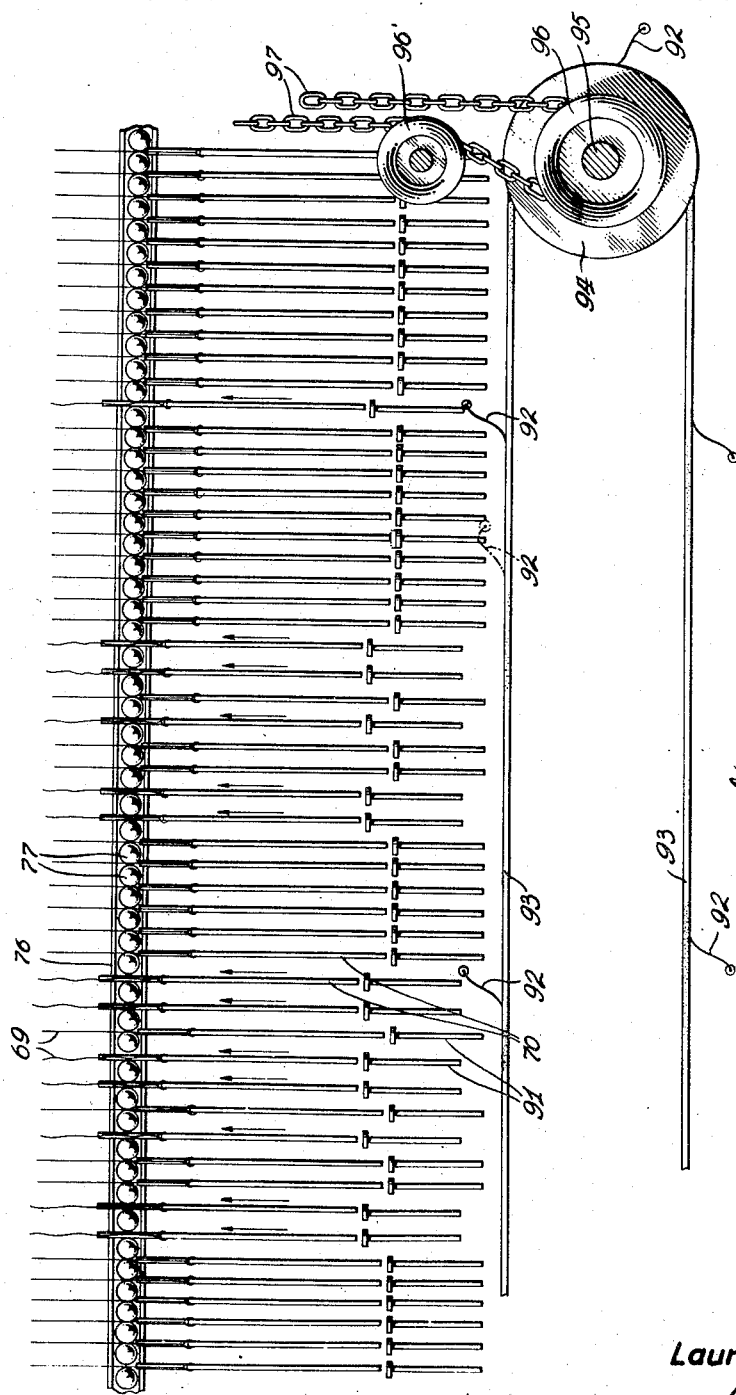
Figure 16 is an elevation of some of the means shown in Figure 14.

Referring to Figures 14 to 16, it is seen that the fingers 72 of the slides 70 of one longitudinal row are adapted to extend through a longitudinally extending tube 76 provided with longitudinal slits which are in vertical register. A plurality of balls 77 are freely displaceable within the longitudinal tube 76 and the two ends of said tube are closed by set screws and nuts as shown in Figure 26.

Three wedges 137 and one wedge 138 are inserted through the slits at one end of the tube 76, while two wedges 137 and one wedge 139 are inserted through the slits at the other end of the tube 76. The wide parts 137' of wedges 137 all have an equal width, while the wide part 138' of wedge 138 is equal to three times the width of the wide part 137' of wedges 137, and the wide part 139' of wedge 139 is equal to five times the width of the wide part 137' of wedges 137. The narrow parts 137", 138" and 139" of the respective wedges 137, 138 and 139 have equal widths.

When all the wedges are in the down position, as shown in Figure 26, the balls 77 are displaced to positively contact each other and abut the wide parts of said wedges so that there is no free space left in the tube to allow projection of the fingers 72 between the balls 77 and consequently no slide 70 can be raised and no card can be dealt.

If a wedge 137 is lifted, the space left between the balls 77 will be sufficient to allow projection of one finger 72 and consequently one slide 70 can be raised, but only one, so one card element can be dealt. Any predetermined number of card elements 12 up to thirteen may be dealt in one deal depending on the relative positions of the wedges 137, 138, and 139, thirteen cards being dealt when all the wedges are in the up position.

The wedges 137, 138 and 139 are moved between their up and down position by means of bell crank levers 140 and 141 and 142 respectively, which are pivotally mounted on shaft 132 and are connected to the wedges by means of strings 131. The upper ends of the levers 140, 141 and 142 pass through slots 133 made in the table top panel 7. There is one set of levers 130, 140, 141 and 142 for each playing area or station A of the machine according to the present invention.

The wedges 137, 138 and 139 are all connected at their lower ends to coil springs 134 which urge said wedges into down position where their wide parts are engaged between the balls 77. When all the wedges 137, 138 and 139 are in their up position only thirteen card elements will be dealt to any one player, because the sum of the spaces between the balls 77 within the tube 76 is made equal to the sum of the thicknesses of thirteen fingers 72. Thus, when thirteen slides 70 are raised, as shown in Figure 16, so that their finger 72 extends through the slit made in the tube 76, the balls 77 will be displaced to positively contact each other and abut the fingers 72 so that there will be no more free space left in the tube. So, lifting of another slide in excess of the thirteen slides already elevated will be positively prevented.

As shown in Figures 15 and 16, the upper end of the fingers 72 extend within the tube 76 even when the slides 70 are in their down limit position so that the balls 77 will be prevented from jumping over the fingers 72 and will, therefore, be maintained in their respective position, one ball between two adjacent fingers.

The slides 70 are raised completely at random through the following means (see Figures 14 to 22 inclusive). A plunger rod 79 is disposed underneath each slide and has an enlarged upper end 80 adapted to abut the lower edge of the associated slide 70. The lower end of each plunger rod 79 passes through a hole made in the top 81 which closes two longitudinally extending trough-like receptacles 82 each containing a plurality of small stones or pebbles 83 of various sizes. The trough-like vessels 82 are provided with a bottom wall 84 of circular cross-section and a shaft 85 is journalled in the end walls 86 of each trough-like vessel 82 and extends along the axis of the circular bottom wall 84. Two arms 87 are secured to the shaft 85 and support a scoop member 88 which longitudinally extends within the trough-like vessel 82 and has substantially a V-shaped cross-section with its outer curved wall 89 in sliding fit with the bottom wall 84 of the vessel 82. A pulley 90 is secured to the projecting end of the shaft 85 outside the vessel 82 and is adapted to be reciprocally rotated, by means which will be described hereinafter, in order to reciprocate the scoop member 88 within the vessel 82 between positions shown in more detail in Figures 19 to 21. In the position shown in Figure 19, the pebbles 83 lie at the bottom of the vessel 82; they are then scooped up by the counter clockwise rotating scoop member 88 to lift the pebbles, which in turn engage and lift the plunger rods 79 to unequal levels depending on the random disposition of the pebbles within the scoop member 88 at each counter clockwise rotation thereof. A certain number of plunger rods 79, and consequently of slides 70, will be elevated to a position in which the fingers 72 of said elevated slides 70 will engage the balls 77 within the tubes 76 and in which position the notch 71 of said elevated slides 70 will clear the balls 74 in the tube 73. After a few reciprocating movements of the scoop members 88, a maximum predetermined number of slides 70 within each longitudinal row of said slides will be elevated to operative position releasing the string 69 attached to each of said slides. There is a trough 82 and scoop member 88 associated with each two longitudinal rows of slides 70, and the scoop members are actuated simultaneously. As previously mentioned, as soon as the maximum number of slides are elevated in each longitudinal row, the balls 77 prevent any further raising of the remaining slides. Similiarly as soon as one slide 70 in a cross row is elevated, the balls 74 and tubes 73 prevent the remaining slides of said cross row from being elevated. So, for instance, only thirteen card elements 12 can be dealt per playing station and an identical card element cannot be dealt to more than one playing station.

In order to make sure that the elevated slides 70 are in their upper limit position, there is provided an additional plunger rod 91 for each slide 70 adapted to abut the lower edge of said slide 70 and to be lifted upon engagement with spring riders 92 which are secured to an endless belt 93 associated with each row of slides and movable longitudinally of said row of slides underneath the same. Each belt 93 is trained on two end pulleys 94 which are mounted at both ends of the trough-like vessel 82. As there are four longitudinal rows of slides 70, there are four end pulleys 94 at each end of the two vessels 82, said four pulleys being mounted on a common shaft 95 which is rotated in a continuous manner through the means of an additional pulley 96 (Figure 16) secured to one of the shafts 95, a chain 97 trained on said pulley 96, a chain tightening pulley 96' engaging said chain 97, idle pulleys 98 (Figure 5) and sprocket wheel 99.

The sprocket wheel 99 is secured to a shaft 100 and is provided with crown teeth 101 in meshing engagement with a bevelled pinion 102 which is rotatable by the crank handle 14, previously mentioned. Two pear-shaped cams 104 and 105 are secured to the shaft 100. Wheels 106 and 107 ride on the cams 104 and 105 respectively. The wheel 106 is journalled at the free end of an arm 108 which is secured to the middle portion of a lever 109 which is pivoted on the machine housing at 110 and having its outer free end attached to a cable 111 which is trained on a small pulley 112 and serves to reciprocate the scoop members 88 within the vessels 82. As shown in Figure 22, the cable 111 is trained on idle pulley 113 and passes over pulleys 90 to be attached at its outer end to a return coil spring 114. The riding wheel 107 (Figure 5) is journalled at the free end of an arm 115 which is pivoted at 143 to the middle portion of a lever 116 and is normally retained by a spring 144 in a position at right angles to lever 116, abutting stop 145. The lever 116 is pivoted at one end 117 and has its outer free end attached to a cable 118 which is trained on an idle pulley 119 (see Figure 11) and is attached to the four strings 58 for reciprocating the yoke members 52.

Referring back to Figure 5, it will be understood that actuation of the crank handle 14 will simultaneously actuate the following elements: the chain 97 will be moved in a continuous manner to thereby cause continuous travel of the spring riders 92 underneath the row of slides 70; the scoop members 88 will be reciprocated within the trough-like vessels 82 through the means of the cam 104, lever 109, and cable 111; and the yoke members 52 will be reciprocated under the action of cam 105, lever 116 and cable 118.

When the arm 115 is pivoted at an acute angle with respect to the lever 116 as shown in dot and dash line in Figure 5, the wheel 107 will no longer ride on the pear-shaped cam 105 and consequently the yoke members 52 will not be reciprocated but all the other movements of the machine will be accomplished during the shuffling and dealing operation. The arm 115 is maintained in an angular position by operating a lever 146 journalled in the table and projecting from the table top, as shown in Figure 1, and which is connected to the arm 115 by means of the string 147. The string 147 is trained on the pulley 148 which is journalled on the pivot 117 of the lever 116. The arm 115 is pivoted into inoperative position when playing poker or any other similar game in which it is desired to first deal a certain number of cards less than thirteen and thereafter to deal extra cards in the same round. Due to the fact that during subsequent dealing, the yoke members 52 will not be operated, the cards already dealt will not be returned to retracted position 12'''.

Finally, the machine, according to the present invention, is provided with counters 149 which are disposed on the table top, as shown in Figures 1 and 23, to count the number of tricks won by each player. There is a counter 149 associated with each playing area A. As shown in Figure 24, the numeral wheel 150 of each counter is actuated by a pawl 151 and ratchet wheel 152. The pawl 151 is mounted at the upper end of a plunger rod 153, the lower end 154 of which is in engagement with a cam 155 which is secured to the shaft 39 actuated by the crank handle 16. Thus when playing bridge, the winner of a trick rotates the handle 16, which, at the same time as it returns all the played cards in the up limit position to their retracted position, will also actuate the associated counter 149 to indicate that the trick has been won by the player who operates a handle 16. It will be noted that the counters 149 of the other players will not be actuated as long as their own crank handle 16 is not operated.

The machine, according to the present invention is operated as follows:

For playing bridge, the arm 115 is left in inoperative position with its rider wheel 107 in contact with the cam 105, as shown in full line in Figure 5, and the wedges 137, 138 and 139 are in fully elevated position while the wedge 129 for the joker is in down position to prevent dealing of a joker card element.

Then the crank handle 14 is rotated whereby all the played card elements which may have been left in the positions 12' or 12" are positively returned to nonplaying retracted position 12''' under the action of cam 105 and reciprocating movement of the yoke members 52. Simultaneously, a certain number of slides 70 are elevated, as previously described, thereby releasing the corresponding strings 69 and allowing clockwise pivotal movement of the bars 45 attached to said strings 69 to cause the associated latching members 40 to release the corresponding main levers 25 whereby the card elements 12 associated therewith are elevated to the intermediate position 12'. The card elements are thus dealt completely at random to each player, only a maximum predetermined number of cards are dealt and in such a manner that a duplicate card cannot be dealt to another player.

After the cards have been dealt and after the play has been announced, the player who is the dummy will pivot the shield 13 in front of his playing station A so that his cards will be visible to all the players.

The game is played by pressing the lever keys 15 corresponding to the card elements in the intermediate position 12'. When the four players have each played one card element, that is at the end of a round, any one of the crank handles 16 is rotated to thereby lift the stirrup 28 at each playing station to cause retracting movement of the card elements in the fully raised position 12", from said position to retracted position 12'''.

At the end of the hand, the number of tricks won by each side is shown on the counters 149 which are then returned to zero reading by a suitable device (not shown). Then the crank handle 14 is again operated to deal another hand of cards.

In a game in which the joker is to be used, the lever 130 is moved to joker dealing position.

For playing poker, the lever 146 is actuated to the position in which the yoke members 52 will remain inoperative. The operation of the levers 140 and 142 depend on the type of poker game being played. For instance, for draw poker, to deal five cards at the beginning of the hand, lever 142 is operated to lift the wedge 139 at each playing station so that five cards may be dealt. Then the dealer operates the crank handle 14 to deal said five cards which take the intermediate position 12'. Each player then raises the extra shield 121 and "plays" the cards he wishes to discard by pressing the corresponding keys 15. Then the dealer turns the handle 16 to return the discarded cards to retracted position and then he turns the handle 14 to deal renewal cards which will automatically replace the same number of cards discarded. Due to the fact that the additional shield 121 is raised none of the other players will see the cards being discarded. When the play is called, the cards are exposed by lowering the shields 121 and pivoting the shields 13.

When playing stud poker the additional shield 121 will be in its down position, and one lever 140 at each player station A will be actuated so that one card may be dealt face down at the beginning of the round. Then another lever 140 is actuated at each playing station so that a second card may be dealt. The player presses the key 15 corresponding to this second card so that it may be made visible to all players. The last named procedure is repeated after each betting interval until five cards are dealt to the players. Then the final round of betting and showdown terminate the game. One of the handles 16 is actuated to return all the cards to retracted position ready for another round.

From the foregoing it will be noted that the machine, according to the present invention, is adapted to play different types of games and positively prevent cheating as the card elements are dealt completely at random due to the action of the shuffling and dealing mechanism.

While a preferred embodiment according to the present invention has been illustrated it is understood that various modifications may be resorted to without departing from the spirit and scope of the appended claims.

I claim:

1. A card playing machine comprising in combination a table-like structure having a plurality of playing stations, a keyboard mounted in the top of said table-like structure at each playing station, each of said keyboards including a set of key assemblies, said top having slots inwardly spaced from each keyboard towards the middle of said structure, shields normally upstanding from said top inwardly spaced from said slots, a set of main levers pivotally mounted within said structure and associated with each keyboard, each main lever of a set engageable at one end by a key assembly of the keyboard associated with said set of main levers, a card element mounted on each of said main levers and adapted to pass through one of said slots, individual lever latching means to maintain each of said main levers in a first position in which said card elements are in a first position retracted below said top, means to individually release said lever latching means to allow the unlatched main lever to pivot from said first position to a second position to raise the associated card element through a slot of said top to a second intermediate position behind one of said shields, the actuation of the key assembly associated with said main lever in its second intermediate position causing further pivotal movement of said last named main lever to raise the card element associated therewith from said intermediate position to a fully elevated position projecting above said shield.

2. A card playing machine as claimed in claim 1, wherein each of said main levers is pivotally mounted intermediate its ends, has one end engageable by the associated key assembly while said lever latching means associated with said main lever is adapted to engage the other end of said main lever, and further including a counterweight mounted at said last named end of said main lever whereby when said lever latching means releases said main lever the latter will pivot under the action of said counter-weight so that its first named end will be lifted, said card element being mounted on the main lever intermediate its pivot and its end engageable by said key assembly.

3. A card playing machine as claimed in claim 2, wherein said lever latching means consists of an L-shaped wire member pivotally mounted intermediate its ends and having one end engageable with an abutment formed on the adjacent end of said main lever and further including a pusher rod engageable with the other end of said L-shaped wire member to pivot the latter to disengage said abutment on said main lever for releasing the latter.

4. A card playing machine as claimed in claim 3, wherein said main lever is made of sheet metal and said abutment means on said main lever consists in a step made at the edge thereof, said L-shaped wire member having a slit end engageable with the stepped edge of said main lever to maintain the latter in its first position, and means to lift said plunger rod to pivot said L-shaped wire member so that its slit end will disengage the step of said main lever to thereby release the latter.

5. A card playing machine as claimed in claim 4, wherein said key assembly includes a substantially vertically disposed key lever pivoted at its lower end within said table structure, and having its upper end passing through a slot made in the top of said table-like structure, and a rocking lever pivoted intermediate its ends adjacent said key lever and having a lateral flange notched near both ends of said rocking lever, the first named end of said main lever forming a tip engageable with the lower notch of the lateral flange of said rocking lever, and a finger depending from said key lever and engageable with the other notch of the lateral flange of said rocking lever, so arranged and constructed that when said main lever pivots from its first to its second position, the tip thereof will move within the lower notch of said rocking lever, and when said key lever is pivoted towards said rocking lever it will cause pivotal movement of the latter to thereby release the tip of said main lever to enable the latter to pivot past the notch with which it was previously engaged.

6. A card playing machine as claimed in claim 1, wherein said shields are hinged on said table top and are pivotal from a position normally upstanding from said table top to a position flat against said table top whereby in said last named position, the card elements in their second position will be visible from all the playing stations.

7. A card playing machine as claimed in claim 6, further including an additional shield mounted on each of said first named shields and movable from a position opposite said first named shield to a position upstanding therefrom whereby, when said first named shields are in upstanding position and said additional shields are in elevated position, the card elements in said third elevated position will be visible only from the playing station with which said card elements are associated.

8. A card playing machine comprising in combination a table-like structure having a plurality of playing stations, a deck of card elements at each station, said decks being similar to one another, the card elements of each deck being mounted for movement between a retracted position hidden from view, an intermediate position, and a fully elevated position, a set of main levers pivotally mounted within said table structure and associated with each card element to move the latter between said first, second and third positions, lever latching means to maintain said main levers in a first position with said card elements in their retracted position, means to individually release said lever latching means to allow the unlatched main lever to pivot from said first position to a second position to raise the associated card element from its retracted position to its intermediate position, said last named means comprising an eccentrically and freely pivoted bar, a plunger rod mounted on the short end of said bar and engaging said lever latching means whereby free pivotal movement of said bar about its pivot will cause said plunger rod to move said lever latching means to unlatch said main lever, a string attached to the short end of said bar and normally maintained taut to prevent pivotal movement of said bar and consequently unlatching of said main lever, a slide member attached at the other end of said string and maintaining said string taut under the action of the weight of said slide member, manually operated means to raise said slide member in order to release said string and allow pivotal movement of said bar to thereby cause unlatching of said main lever by said lever latching means, and a key assembly associated with each main lever and operable to allow the main lever to pivot from its second position to a third position to raise the associated card element from its intermediate position to its fully elevated position.

9. A card playing machine as claimed in claim 8, wherein said manually operated means include a tough-like vessel disposed underneath said slide member, pebbles of various sizes and shapes freely disposed within said vessel, a manually operable reciprocable scoop member mounted within said vessel for raising and dropping said pebbles within said vessel, a vertically disposed plunger rod adapted to engage said pebbles at its lower end, to be lifted thereby upon raising said pebbles within said vessel and adapted to abut said slide member at its upper end to thereby raise said slide member which will in turn loosen said string.

10. A card playing machine as claimed in claim 9, wherein said main lever, said main lever latching means, said plunger rod, said eccentrically pivoted bar, said string, said slide member and said plunger rod abutting said slide member form an assembly, there being one such assembly associated with each card element at each playing station, the slide members for all the card elements of one station being disposed in a row, said vessel being disposed longitudinally underneath said row of slide members, and the plunger rods associated with said slide members entering said vessel and adapted to come in contact with the pebbles in said vessel, said scoop member extending the entire length of said vessel to raise pebbles underneath all the plunger rods associated with the slide members of said row.

11. A card playing machine as claimed in claim 10, further including means to prevent more than a maximum number of slide members to be raised upon actuation of said scoop member.

12. A card playing machine as claimed in claim 11, wherein said last named means include a longitudinally slit tubular member closed at both ends, a plurality of balls freely displaceable within said tubular slit member, a finger mounted on each of said slide members of said row and engageable through the slit of said tubular member to displace the balls therein as said slide members are raised, said balls preventing further raising of said slide members when the maximum predetermined number of said slide members have already been raised.

13. A card playing machine as claimed in claim 12, wherein the sum of the distances between the balls and the ends of said closed tubular member is exactly equal to the sum of the displacements of said balls caused by the engagement of said tubular member by said fingers when the maximum predetermined number of slide members are raised.

14. A card playing machine as claimed in claim 13, further including means to vary the maximum number of slide members to be raised upon actuation of said scoop member, said last named means including wedge members engageable with the longitudinal slit of said tubular member between said balls, and manually controlled means to move said wedge members between a position projecting between said balls and a position withdrawn therefrom.

15. A card playing machine as claimed in claim 14, wherein there are a plurality of wedge-like members having different widths and so arranged that when all of said wedge-like members are in engagement with said slit tubular member and extend between said balls, not a single slide member will be raised upon actuation of said scoop member, whereas the number of slide members capable of being raised will be progressively increased as said wedges are withdrawn from between said balls.

16. A card playing machine as claimed in claim 13, wherein there is a row of slide members associated with each playing station, the slide members of each row forming cross rows in which the slide members are transversely aligned, the slide members of each cross row being associated with card elements of identical configuration, one for each station, and means to prevent more than one slide member of each cross row from being raised upon manipulation of said scoop member, said means comprising a second longitudinally slit tubular member associated with each cross row and through which extend said slide members of said cross row, a plurality of balls freely displaceable within said second tubular member, said second tubular member being closed at both ends, said slide members having notches in one side edge thereof engageable by said balls in said second tubular member when said slide members are in non-raised position, whereby raising of one slide member of one cross row will displace said balls within said second tubular member an amount sufficient to cause said balls to firmly engage the notches of the remaining slide members of said cross row to prevent lifting of said remaining slide members.

17. A card playing machine as claimed in claim 16, further including a wedge member adapted to engage a slit tubular member associated with a cross row to prevent raising of all the slide members disposed in said cross row and manually operated means to withdraw said wedge-like member from said tubular member.

18. A card playing machine as claimed in claim 16, further including second plunger rods mounted for abutting the lower edge of said slide members, a longitudinally displaceable endless belt disposed underneath each longitudinal row of said slide members, spring elements mounted at intervals on said belt and adapted to engage said second plunger rods upon longitudinal movement of said belt to urge said second plunger rods to raise said slide members which are not fully elevated, and manually operated means to move said endless belt simultaneously with the manual operation of said scoop member.

19. A card playing machine as claimed in claim 18, further including means to positively return all the card elements in said second and third positions to said first position operable simultaneously with said endless belt and with said scoop member, said last named means comprising a counter-weighted yoke-shaped member pivoted on the pivot of said eccentrically and freely pivoted bars and normally in a pivoted position clearing all the main levers at one playing station, there being provided one such yoke member for each playing station, and means for simultaneously pivoting said yoke-shaped members of all said playing stations to thereby engage all said main levers to pivot the same to return all the card elements to their retracted first position.

20. A card playing machine as claimed in claim 19, further including means to prevent operation of the means to positively return all the card elements in said second and third positions to said first position.

21. A card playing machine as claimed in claim 19, further including an abutment on said yoke-shaped member engageable with all the long ends of all the bars associated with a playing station whereby upon pivotal movement of said yoke-shaped member the latter will in turn positively pivot said bars in a direction to loosen the string attached to said bars and to cause the first named plunger rods to disengage the main lever latching means.

22. In a card playing machine as claimed in claim 21, further including means to return all the card elements of all the playing stations which are in their fully elevated positions to their retracted positions, said last named means comprising a crank handle at each station, cam members actuated by said crank handles, a plunger member engageable by said cam members to be raised thereby, a stirrup at each playing station, a hook member upstanding from each main lever and engageable with said stirrup when said main lever is pivoted to a position in which the associated card element is in its fully elevated position, and linkage means between said plunger member and said stirrup causing lifting of said stirrup upon raising of said plunger member to thereby pivot the main levers hooked by said stirrup and return the card elements associated with said last named main levers to their retracted position.

23. In a card playing machine as claimed in claim 22, further including counters associated with each playing station and adapted to give an indication of the number of tricks won by each station, each of said counters having a driving connection with the crank handle for the playing station with which said counter is associated.

24. A card playing machine comprising, in combination, a table-like structure having a top provided with slots, a deck of card elements, the card elements of said deck being mounted for movement through said slots between a first retracted position below said top, a second intermediate position and third fully elevated position projecting through said slots, a set of main levers pivotally mounted within said structure, each card element being mounted on a separate lever of said set, each main lever pivotal for movement between a first, second and third position causing the card element mounted thereon to take its first, second and third positions respectively, lever latching means to maintain said levers in their first position, means to unlatch a number of said lever latching means to release the corresponding levers for movement from their first to their second position, means to move said released levers from their first to their second position, means to individually and selectively move the levers in their second position from said second position to their third position, and means to return the moved levers to their first position.

25. A card playing machine comprising in combination a table-like structure having a top providing a plurality of playing stations and having slots through said top at each playing station, a deck of card elements at each station, said decks being similar to one another, the card elements of said decks being mounted for movement through said slots between a first retracted position below said top, a second intermediate position and a third fully elevated position projecting through said slots, a set of main levers associated with each deck pivotally mounted within said structure, each card element of a deck being mounted on a separate lever of the associated set, each main lever being pivotal for movement between a first, second and third position causing the card element mounted thereon to take its first, second and third position respectively, lever latching means to maintain said levers in their first position, means to unlatch an equal maximum predetermined number of said lever latching means at each playing station to release the corresponding levers for movement from their first to their second position, means to positively prevent the unlatching of more than said predetermined maximum number of lever latching means at each playing station, means to move said released levers from their first to their second position, means at each station to individually and selectively move the levers in their second position from said second position to their third position, and means to return the moved levers at all stations in said third position to their first position.

26. A card playing machine as claimed in claim 25, further including means to shield the card elements in their second intermediate position, whereby said card elements are visible only from the station with which they are associated, while the card elements in said third fully elevated position are visible from all stations.

27. A card playing machine as claimed in claim 25, further including shield means associated with said card elements, whereby said card elements in said second and third positions are visible only from the station with which said card elements are associated.

28. A card playing machine as claimed in claim 24, wherein said means to unlatch a number of said lever latching means include means to select said unlatching means completely at random.

29. A card playing machine as claimed in claim 28, including means to positively prevent the unlatching means associated with the main levers bearing identical card elements from being selected from more than one playing station.

30. A card playing machine as claimed in claim 24, wherein the means to return all the moved main levers to their first position are operable simultaneously with the means to unlatch a number of said lever latching means.

31. A card playing machine as claimed in claim 24, further including means to prevent the means to individually and selectively move said levers from their second to their third position, from being operable when said levers are at positions other than their second position.

32. A card playing machine as claimed in claim 24, further including means to prevent the release of the main lever on which is mounted a card element bearing a joker configuration, and means to make said last named means inoperative.

33. A card playing machine as claimed in claim 24, further including means operable to vary the number of main levers unlatched by said lever latching means.

34. A card playing machine as claimed in claim 24, further including means to render inoperative the means to return all the moved main levers to their first position.

References Cited in the file of this patent

UNITED STATES PATENTS

| | | |
|---|---|---|
| 623,376 | Landenberger | Apr. 18, 1899 |
| 2,023,210 | Potter | Dec. 3, 1935 |
| 2,026,682 | Jeffries | Jan. 7, 1936 |
| 2,192,779 | Swan et al. | Mar. 5, 1940 |

FOREIGN PATENTS

| | | |
|---|---|---|
| 395,939 | Great Britain | July 27, 1933 |